United States Patent [19]

Howlett

[11] 4,389,887

[45] Jun. 28, 1983

[54] WIND VELOCITY GAGE FOR SAILBOATS

[76] Inventor: John L. Howlett, 1717 Ashtan, Walled Lake, Mich. 48088

[21] Appl. No.: 271,639

[22] Filed: Jun. 8, 1981

[51] Int. Cl.³ .......................... G01F 1/28; G01W 1/02
[52] U.S. Cl. .................................... 73/189; 73/861.75
[58] Field of Search ............ 73/186, 188, 189, 861.74, 73/861.75

[56] References Cited

U.S. PATENT DOCUMENTS

| 2,935,872 | 5/1960 | Misner | 73/189 |
| 4,080,826 | 3/1978 | Perretta | 73/188 |
| 4,137,781 | 2/1979 | Andrus | 73/189 |

FOREIGN PATENT DOCUMENTS 131679  6/1902  Fed. Rep. of Germany ........ 73/186

Primary Examiner—James J. Gill
Attorney, Agent, or Firm—Harry R. Dumont

[57] ABSTRACT

A wind velocity gage for use on sailboats including a vertical shaft to be mounted on or near the mast head. A vane is pivotally mounted on the end of the shaft and includes a forward small weighted end and a rear vertically oriented fin. A wind velocity pointer is pivotally mounted on the rear fin and moveable differentially to one of several positions indicating wind velocity. A scale for read-out is provided about the circumferential periphery of the fin.

8 Claims, 5 Drawing Figures

U.S. Patent  Jun. 28, 1983  4,389,887
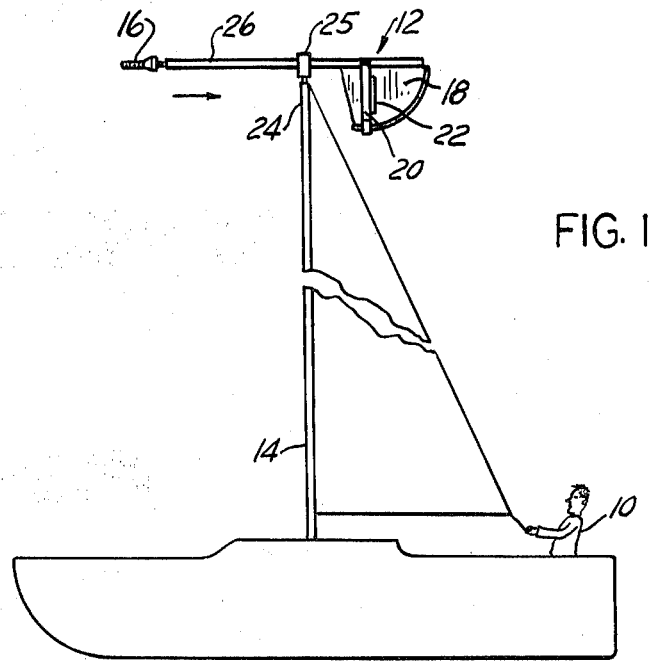
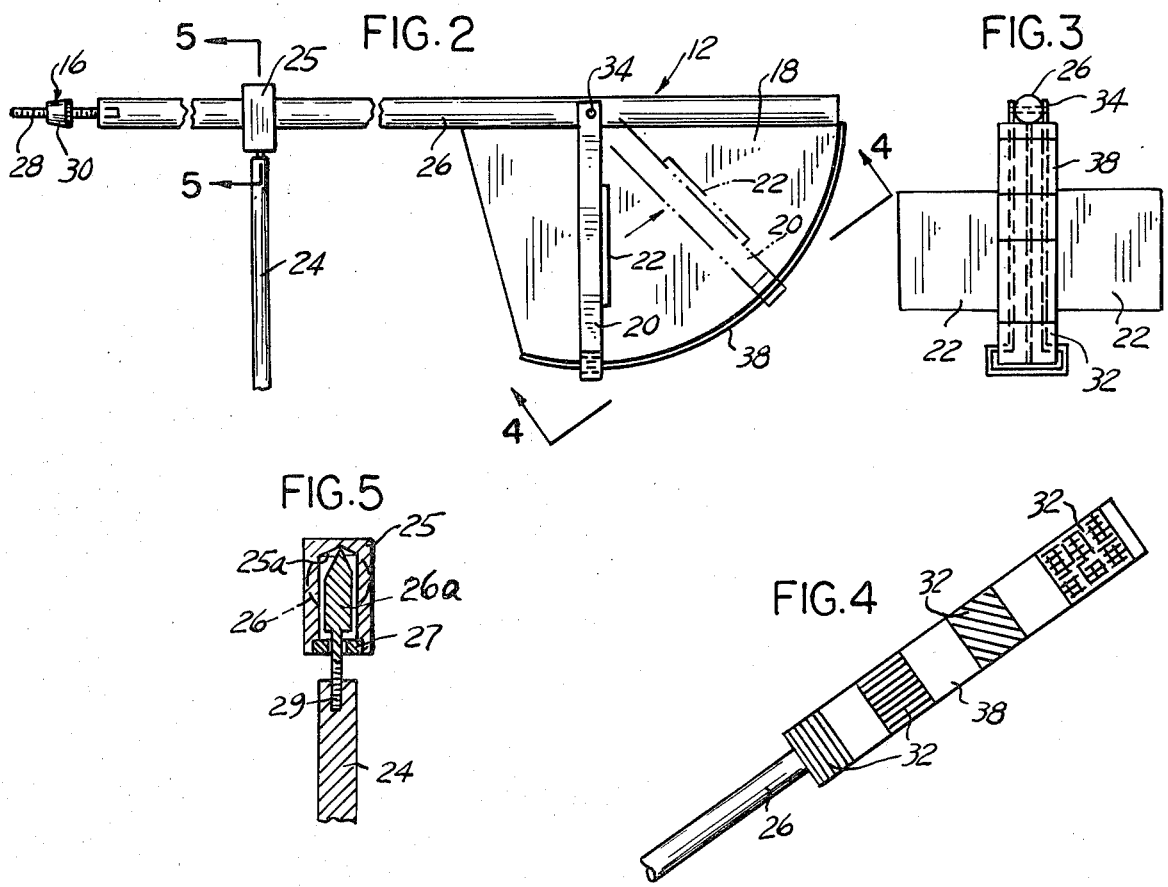

WIND VELOCITY GAGE FOR SAILBOATS

BACKGROUND OF THE INVENTION

There exists a need for small boat operators, particularly sailboat operators, to have a reliable indication of both wind direction and velocity. It is also important that the device giving this information be mounted above the turbulence existing just above the water surface and further in a position from which it may be viewed by the small boat operator. A number of devices which may be generally characterized as anemometers are known to the prior art. Most of these are designed for ground level operation or manual handling.

U.S. Pat. No. 2,749,751 issued to N. R. Hastings on June 12, 1956 for "Anemometer Wind Vane" is of interest for its showing of a general wind vane configuration. The readout velocity indicator is however not particularly suitable for boat operation as is the present invention. U.S. Pat. No. 2,040,305 was issued on May 12, 1936 to S. Grahm for "Wind Speed and Direction Indicator". This device was designed to indicate to air observers the condition of the wind velocity. U.S. Pat. No. 1,911,169 was issued on May 23, 1933 to A. M. Trogner for "Air Navigation Apparatus". This patent again is of interest for its showing of a wind velocity indicator but it is of a substantially different type from that used by applicant and does not provide a visable read-out that would be adaptable to small boat operation. U.S. Pat. No. 2,889,707 issued on June 9, 1959 to W. J. Snider for "Anemometer". This patent is of interest for its showing of a portable anemometer suitable for vest pocket carrying with a pivotal pointer. It does not however contain a structure that would provide a useful read-out to a boat operator from his position at the tiller or in the boat cockpit.

SUMMARY OF THE PRESENT INVENTION

The present invention is a wind direction and velocity gage that is structurally designed and adaptable for use on a boat such as a sailboat with mast mounting preferred. The general configuration is that of a vane with a pointer. The pointer itself is pivotally mounted on the vane and moveable from a zero indicating vertical position to a position which indicates by the extent of arcuate movement the velocity of the wind striking it. A pair of vertical fins extend laterally from both sides of the pointer to receive the airstream force as the wind strikes them.

BRIEF DESCRIPTION OF THE DRAWINGS

The present invention will now be described with reference to the accompanying specification and to the drawings in which like numerals refer to the same elements and in which:

FIG. 1 is a general view of the sailboat having the wind velocity gage mounted at its mast head;

FIG. 2 is a right elevational view showing the wind velocity indicator in an operating condition;

FIG. 3 is a right elevational view of the device of FIG. 2 showing the velocity indicator pointer in a substantially vertical or zero velocity position;

FIG. 4 is a view taken along the section lines 4—4 of FIG. 2 showing the indicator scale; and FIG. 5 is a sectional view taken along the section lines 5—5 of FIG. 2 showing the manner of mounting of the indicator on its vertical shaft.

DETAILED DESCRIPTION OF THE PREFERRED EMBODIMENT

FIG. 1 is a general view of a sailboat with the operator 10 shown in his rearward position steering and operating the boat. The wind velocity gage 12 is shown mounted at the upper end of the mast 14 in a operating position. The velocity gage includes a forward lefthand end portion 16 and a rearward vertical fin portion 18. A pointer 20 including a pair of laterally extending fins 22 is mounted in a vertically pivotal position near the righthand end of the velocity indicator 12. The pointer 20 is moveable about the vertical fin portion 18.

FIGS. 2 and 3 show the detail of the structure of the velocity gage 12. The device is pivotally mounted on the top of a shaft 24 which is fixed to the end of the mast 14 at an enlarged body portion 25. Included in the velocity gage is a horizontal shaft 26 carrying the left pointer end 16. Included in the left pointer end 16 is an outstanding threaded stud 28 and an internally threaded weight 30. The weight 30 is threadably moveable leftwardly or rightwardly on the stud 28 so that the fore and aft balance of the indicator 12 can be achieved. The righthand fin 18 has the function of swinging the left end into the direction of the wind. In its operation, the unit moves similar to the manner of the wind vane. The velocity pointer 20 is of a general U-shaped configuration including a pair of side portions each of which carries the lateral fin 22 associated with it.

The lower arcuate surface of the fin portion 18 comprises a scale 38 circumferentially extending through about 90°. As best shown in FIG. 4, the scale further includes a plurality of spaced color coded sectors 32 which indicate the magnitude of the wind speed for the benefit of the boat operator. Wind speed is an important factor in the operation of sailboats and the operator has a continual need for a reliable read-out of that parameter.

FIG. 2 shows the pointer 20 rotatably mounted on a pivot pin 34 around the shaft 26. The pointer 20 is shown as it is moved in a counterclockwise direction to a position shown in phantom indicating wind velocity.

FIG. 5 shows to enlarged scale the horizontally pivotal mounting for the shaft 26 at its enlarged body portion 25 on the upper end of the vertical shaft 24. The mounting parts include a pivot needle 26a having its pointed end supportably engaging the upper surface of a central cavity 25a formed in the body portion 25. The pivot needle 26a has a threaded end 29 mounting it on the upper end of the shaft 24. A retaining ring 27 is used to retain the parts in their assembled position.

It will thus be seen that I have provided by my invention a new and improved wind velocity gage. The device is one specially adapted for use in a sailboat where the read-out is made directly available in a most useful fashion to the boat operator.

I claim:

1. A wind velocity gage for a sailboat, comprising:
   a vertical shaft mounted on the upper end of the sailboat mast;
   a horizontal shaft pivotally mounted at the upper end of said vertical shaft, said horizontal shaft having a weight adjustment means at its forward end and a vertical arcuately formed fin at its rearward end;
   a wind velocity pointer pivotally mounted on said fin and having a pair of vertical side fins; and
   a visual readout sector peripherally formed on an extended edge of said fin arcuate surface and having a downwardly facing indicating surface for providing a wind velocity indication responsive to the pivotal movement of said pointer.

2. The combination as set forth in claim 1 wherein said weight adjustment means includes a forwardly oriented stud and a weight having a threaded portion moveable to and fro on said stud.

3. The combination as set forth in claim 1 wherein said pointer is of a generally U-shaped configuration.

4. The combination as set forth in claim 1 wherein said vertical side fins of said pointer are substantially spaced from the pivot point of said pointer for increasing its sensitivity.

5. The combination as set forth in claim 1 in which said vertical shaft has fixed to its upper end a pivot needle which is in an opening formed in the lower surface of said horizontal shaft.

6. The combination as set forth in claim 5 in which said pivot needle includes a lower screw portion connecting it to the upper end of said vertical shaft.

7. The combination as set forth in claim 1 wherein said read-out sector includes a plurality of spaced indicia for indicating wind velocity.

8. The combination as set forth in claim 1 in which said read-out sector includes a plurality of different color bands for indicating wind velocity.

* * * * *